United States Patent

[11] 3,579,012

[72] Inventors Walter K. Zwicker
Scarborough, N.Y.;
Alfred Milch, Teaneck, N.J.
[21] Appl. No. 767,958
[22] Filed Oct. 16, 1968
[45] Patented May 18, 1971
[73] Assignee U.S. Philips Corporation
New York, N.Y.

[54] IMAGING DEVICE WITH COMBINED THIN MONOCRYSTALLINE SEMICONDUCTIVE TARGET-WINDOW ASSEMBLY
10 Claims, 3 Drawing Figs.

[52] U.S. Cl. .......... 313/65, 317/234
[51] Int. Cl. .......... H01j 31/26, H01l 3/12
[50] Field of Search .......... 313/65 (AB), 65 (A); 317/234 (8)

[56] References Cited
UNITED STATES PATENTS

| | | | |
|---|---|---|---|
| 2,890,359 | 6/1959 | Heijne et al. | 313/65 |
| 3,011,089 | 11/1961 | Reynolds | 313/65X |
| 3,414,434 | 12/1968 | Manasevit | 317/234X |
| 3,458,782 | 7/1969 | Buck et al. | 313/65X |
| 3,484,662 | 12/1969 | Hagon | 317/234X |

OTHER REFERENCES
Zuleeg- " Silicon-on-Sapphire Transistors Point Way to Microwave IC' s" - Electronics, March 20, 1967, pages 206—208 317-235-21.1

*Primary Examiner*—Roy Lake
*Assistant Examiner*—V. Lafranchi
*Attorney*—Frank R. Trifari

ABSTRACT: An imaging device, especially a vidicon-type camera tube, in which the active target layer is an ultrathin monocrystalline semiconductor grown epitaxially on a thicker supporting monocrystalline substrate which is transparent to the imaging radiation and thus serves as a window for the radiation to enter the tube to be detected by the semiconductor.

Patented May 18, 1971 3,579,012

INVENTORS
WALTER ZWICKER
ALFRED MILCH
BY
Frank R. Trifari
AGENT

IMAGING DEVICE WITH COMBINED THIN MONOCRYSTALLINE SEMICONDUCTIVE TARGET-WINDOW ASSEMBLY

This invention relates to a light-sensitive device employing as the active element an ultrathin semiconductive layer, and in particular relates to an imaging device in the form of a camera tube employing a monocrystalline target layer with electron beam readout.

U.S. Pat. No. 2,890,359 describes a camera tube, more popularly known as a vidicon, employing a semiconductive layer vapor deposited on the glass front wall of the tube envelope as the active or target layer of the tube. Between the beam side of the target and a rear, transparent signal electrode is located a barrier layer in the form of a PN junction. Voltage is applied to the signal electrode in such manner as to reverse bias the junction, thereby charging it up to form a two-dimensional array of charged image elements. Incident radiation from the scene to be imaged traversing the front glass wall is absorbed in the vicinity of the junction where it generates hole-electron pairs which discharge the image elements in proportion to the intensity of the absorbed radiation. Periodically, an electron beam scans across the target layer recharging each of the image elements. The current flow in an output circuit connected to the signal electrode thus depends upon the amount of charge deposited by the electron beam as it scans across each image element to recharge it to the biasing potential. This output is the video signal which can be processed in the normal manner for reception by a television receiver to produce a visible image of the original scene. The camera tube described in this patent, while commercially quite successful, nevertheless has posed certain problems in its manufacture and in its performance, among which is its limited lifetime.

In the Bell System Technical Journal, Feb. 1967, pages 491—495, there is described an improved camera tube of the barrier layer type employing a monocrystalline N-type silicon target. As is described in this publication, in view of the high absorption coefficient of silicon for visible light, most of the hole-electron pairs are generated near the incident surface of the silicon, which is adjacent the signal electrode. The barrier layer image elements are constituted, for isolation purposes, by islands of P-type conductivity forming an array of PN junctions with the N-type silicon substrate. The P-type islands are at the side of the target which receives the charging electron beam. For satisfactory operation, the minority carriers, which are generated as holes at the scene side of the N-type substrate, must diffuse through the target to the junction where they are collected, which requires that they possess a sufficiently long lifetime to carry out this task.

It has been found that the silicon layer must be kept extremely thin, of the order of 0.3—0.6 mil (0.0003—0.0006 inch), in order to obtain an adequate collection efficiency of these minority carriers. Moreover, as the minority carriers diffuse toward the barrier, they also move laterally which reduces the target resolution; thus high resolution imaging devices also require thin targets of the above-mentioned dimensions. In the camera tube described in the Bell publication, the target is not mounted directly on the glass front wall of the tube but instead is mounted near the glass wall or envelope window on a supporting frame. In the manufacture of such thin targets, it is impossible within the present state of the art using normal slicing and lapping operations to achieve a wafer of such extreme thinness, since the material, which is single crystal silicon, is brittle and very fragile and therefore prone to breakage. The technique found most satisfactory to date has been to start with a much thicker slice, for instance 5 mils, and using controlled etching to remove the central portion of the wafer to the desired thickness of 0.3—0.6 mil leaving an annular strengthening rim of the starting thickness to support the active target area. The manufacture of such structures with a uniform thickness across the entire target area which may be approximately one-half to 1 inch in diameter, is extremely difficult. Moreover, the mounting of such wafers within the tube envelope may also be a problem because of their fragility. There is no solution to this problem using a thicker and thus stronger target, as its sensitivity to the shorter wavelength region of the visible spectrum falls off rapidly, making the tube more sensitive in the near infrared than in the visible part of the spectrum giving a distorted image.

The main object of the invention is to eliminate or at least substantially reduce the difficulties described above in the manufacture of photosensitive devices using ultrathin photosensitive semiconductive layers.

Our invention is based on the recognition that the major difficulty with the prior art techniques stems from an approach which starts from a separate thick single crystal semiconductive slice which must thereafter be thinned down to a very small value and then mounted in its thinned fragile condition within an envelope adjacent a radiation transparent window. Our invention is based on the concept of uniting the window and the thin semiconductive target, and, instead of reducing the thickness of a thicker slice, increasing the thickness, so to speak, of a thinner slice in direct contact with and supported by the device window. The improved photosensitive device in accordance with our invention comprises a radiation transparent window of monocrystalline material on which is grown by known epitaxial techniques a thin layer of a monocrystalline semiconductive material to produce the target layer and the window united epitaxially as a sturdy, rugged body ready for processing by the normal techniques to provide the array of image elements and which is then easily mounted with little fear of breakage directly to the device envelope. In a preferred arrangement, the monocrystalline window is of sapphire and the semiconductive layer is of silicon. Sapphire is transparent to visible radiation. Moreover, there already exists in the art established techniques for growing device quality monocrystalline silicon epitaxially on monocrystalline sapphire, which techniques are suitable for the manufacture of the combined target-window of our invention.

The invention will now be described in greater detail with reference to the accompanying drawing wherein.

Figures 1, 2:
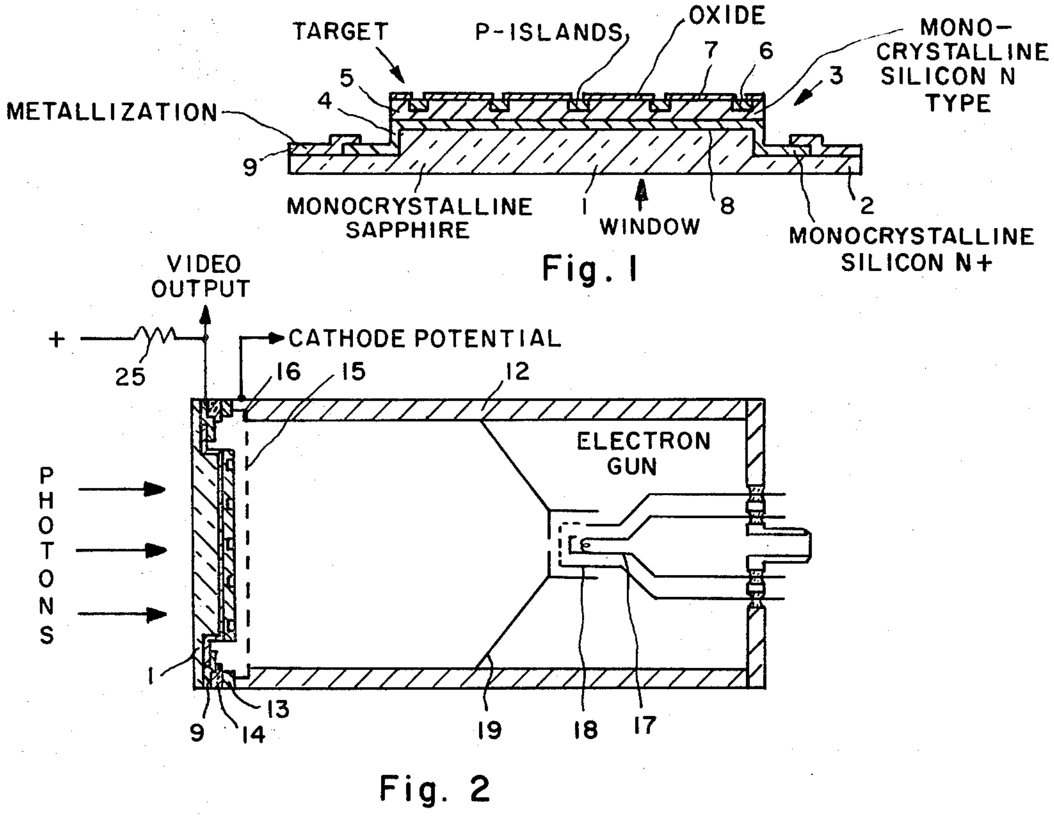
FIG. 1 is a cross-sectional view of one form of combined target-window assembly of our invention.
FIG. 2 is a cross-sectional view of a camera tube of the invention with the target-window assembly of FIG. 1 mounted as part of the tube envelope.

One form of the combined target-window assembly of the invention for use in a vidicon is illustrated in FIG. 1. It comprises a radiation transparent window portion 1 in the form of a monocrystalline wafer having an annular rim portion 2 of reduced thickness. Epitaxially deposited on the monocrystalline window 1 is a layer 3 of device quality monocrystalline semiconductive material. In the form shown, the semiconductive layer 3 is comprised of two parts. The part 4 adjacent the window is a highly conductive layer to serve as the signal electrode. The surface portion 5 is comprised of higher resistivity material. As is known in the art, in the layer portion 5 is disposed an array of islands 6 of opposite-type conductivity to form the diode array previously described. In actual practice, there will be approximately 500 to 800 rows and 500 to 800 columns of such diodes producing over one-quarter million diodes. Only a few are shown schematically in the drawing as the manner of making these diodes and their geometry involve known techniques which are not important to the present invention. The conventional way for making such diodes is to diffuse active conductivity modifying impurities into the monocrystalline layer 5 using oxide masking to control the regions where the islands are to be formed. Either the same oxide mask or a fresh oxide layer 7 is provided on the surface over the junction edges to protect same and also to passivate the semiconductor surface. Holes in the oxide over the P-type islands enable the beam to have access thereto. It is also conventional to provide metallic contacts to the islands which overlap the oxide to reduce charging of the oxide, or to provide a resistive "sea" over the oxide and in contact with the islands to prevent charging of the oxide. These structural features have been omitted from the drawing as unnecessary to an understanding of the invention. As is evident from FIG. 1, the monocrystalline semiconductor extends entirely over the top surface 8 of the window and also partially over the step and rim portion 2 insofar as the signal electrode portion 4 is concerned, whereas the higher resistivity portion 5 is confined to the top surface. The extension of the signal portion 4 is used conveniently as an electrical contact. This is achieved by metallizing 9 the edge of the signal portion 4 as well as the surrounding edge of the window rim portion 2.

As mentioned before, the window is preferably of sapphire, and the semiconductor is preferably of silicon. These materials are chosen as there already exists established technology for growing monocrystalline silicon on monocrystalline sapphire in such manner as to produce a silicon quality adequate to build semiconductor devices therein, such as the diode array employed in the embodiment of FIG. 1. The actual process for such heteroepitaxial growth is not a part of our invention, and any known manner for accomplishing the required structure may be employed. "Progress in Solid State Chemistry" , Vol. 3, Pergamon Press (1967), pages 1—44 contains a complete description of the then state of the art regarding epitaxial growth using chemical vapor deposition for the case of heteroepitaxy of silicon on oxide substrates. The description in this publication as well as those found in the papers reported in its extensive bibliography will enable those skilled in this art to grow a device quality monocrystalline semiconductor on an oxide-type substrate which will be transparent to the radiation involved in a normal vidicon. Our invention is not limited to silicon on insulating sapphire heteroepitaxy. Any monocrystalline base or substrate can be employed provided that it will be transparent to the radiation which is intended to be detected by the overlying semiconductor. Simply put, the radiation must be capable of substantially traversing a relatively thick (generally exceeding 10 mil), rugged window but be absorbed in an ultrathin (generally below 0.8 mil) semiconductor supported by the window. Thus, another example is of gallium arsenide as the semiconductive active layer epitaxially deposited on an insulating substrate such as rock salt. The window may even be of semiconductive material. For instance, a window of monocrystalline zinc selenide supporting monocrystalline gallium arsenide will be able to detect radiation in the visible wavelength range, as such radiation will traverse the window and be absorbed in the active semiconductive layer. Using insulating sapphire, in order to make external connection to the signal electrode, conductive metallization must be provided. Known techniques exist for metallizing sapphire and silicon. The well-known molybdenum-manganese metallizing process may be employed, or sputtering of molybdenum, or the process described in U.S. Pat. No. 3,340,125.

The aforementioned paper in "Progress in Solid State Chemistry" describes various methods for preparing the sapphire surface for epitaxial growth of the silicon. The thinner shoulder 2 can be obtained by lapping or etching. During the growth of the silicon, using the apparatus illustrated on page 19 of the aforementioned paper, a high concentration of phosphine is introduced into the silicon tetrachloride vapor in order to obtain first a thin layer of strongly phosphorus-doped silicon to serve as the signal electrode, after which the phosphine concentration is reduced to grow the layer portion 5 of higher resistivity. In actual practice, the portion 5 will extend over the entire surface of the highly doped layer 4, and the structure illustrated in FIG. 1 is readily obtained by standard etching techniques to remove the edge portions of the layer 5 to enable good electrical contact to be made to the highly doped signal electrode 4. As an example, which is not to be considered as limiting, the central sapphire portion is approximately 0.04 inch thick, with the ledge portion 2 approximately 0.02 inch thick. The doping of the $n+$ silicon layer 4 preferably exceeds about $10^{19}$ phosphorus atoms per cubic centimeter. The layer 5 preferably has a phosphorus concentration giving it a resistivity of about 10 ohm-cm. The thickness of the layer 4 would be approximately 3,000—4,000A and the thickness of the layer 5 approximately 0.5 mil. Not only does the $n+$ layer 4 afford a better contact to the metallization 9, but in addition it will serve to reduce the surface recombination velocity. As mentioned earlier, the active target layer 3 should have a reasonable minority carrier lifetime as well as low surface recombination velocity. Thus, careful growth followed by slow cooling, and subsequent vacuum heating and gettering treatments, which are known in the art (see, for example, JECS, Apr. 1960, 298—301 and Electrochemical Technology, July—Aug., 1967, 406—407), may be employed to obtain semiconductive material of adequate lifetime. The sapphire substrate may be obtained in the form of an ingot from chemical suppliers and slices cut from it with the desired crystallographic orientation. Thus, to grow a silicon film, the orientation of the sapphire may be. As an alternative, sapphire webs which have recently been reported may be used as the monocrystalline window.

After the desired thickness of silicon has been grown, and the undesired peripheral portions removed, the combined sapphire-silicon structure, which is a rugged member, is easily handled during the known processing for providing the P islands using the known planar technology. At the end of the process, the resultant structure will appear as illustrated in FIG. 1, with, as previously explained, either button contacts on the islands and the surrounding oxide and/or a resistive sea over the entire surface to prevent oxide charging. In this form, the sensitive junctions are protected from contamination and the combined target-window is ready for assembly into the vidicon tube.

FIG. 2 illustrates one suitable form of vidicon tube assembly using a metal envelope wall which will also serve the function of the drift tube. The tube illustrated in FIG. 2 has cylindrical geometry. The envelope wall 12 is closed off at one end by the window of FIG. 1. In case the wall 12 is made of a metal which will not necessarily be easily sealable to ceramic or vitreous insulating materials, it may be desirable to provide a transition member for sealing purposes. This is accomplished by providing a Kovar ring 13 which is readily brazed to the end of the envelope wall 12. The Kovar is readily sealed in a vacuumtight manner with an insulating material to the metallization 9 on the window. For this purpose, glass frit 14 may be provided as an annular ring on the metallization, the Kovar ring placed in contact with the glass frit, and the assembly heated until the frit melts and is sealed to the Kovar on one side and the metallization on the opposite side. Known vidicons employ a fine mesh grid, generally at cathode potential, located in front of the target surface. The tube illustrated in FIG. 2 contains the mesh designated 15 mounted on a shoulder 16 of the metal envelope 12. The remainder of the tube is conventional. It comprises a standard electron gun merely shown schematically as a heated cathode 17, a control grid 18, and an anode 19; the details of the gun construction are unnecessary for an understanding of the present invention.

Figure 3:
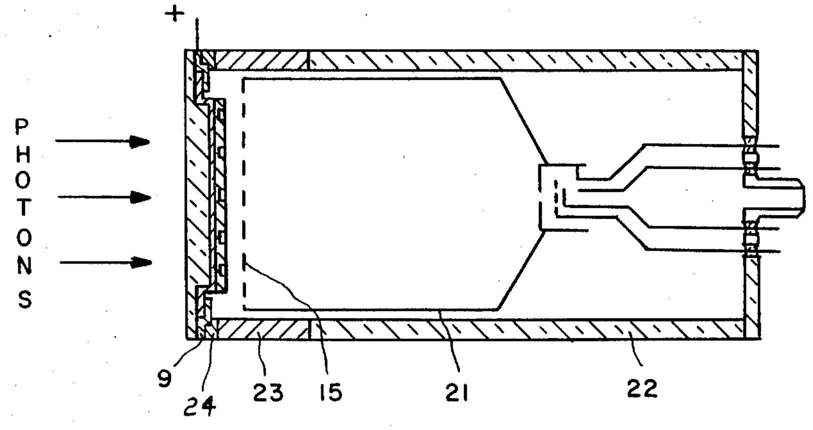
FIG. 3 is a cross-sectional view of a modified camera tube.

FIG. 3 illustrates a modification which is more like the existing vidicon in that it employs a separate drift tube 21 at the end of which the mesh 15 is mounted in the normal manner. The envelope is also more conventional in that it is predominantly of glass 22 sealed to a metallic portion 23 at the end adjacent the target which can be brazed 24 directly to the metallization 9 on the window.

In operation, the signal electrode 4 is usually biased positively 5—25 volts relative to cathode potential, and the output taken across an impedance 25 in the signal circuit.

As will be observed, the invention provides a combined window-semiconductive photosensitive layer for use in photosensitive devices, and especially imaging devices of the camera tube or vidicon type. The monocrystalline semiconductive layers which serve as the active photosensitive element and which are ultrathin to obtain good sensitivity and resolution are supported at all times during their manufacture and assembly on a monocrystalline transparent substrate, which provides a rugged structure easily handled and not prone to breakage and suitable for use as a high quality target-window in the final imaging device.

While we have described our invention in connection with specific embodiments and applications, other modifications thereof will be readily apparent to those skilled in the art without departing from the spirit and scope of the invention as defined in the appended claims.

We claim:

1. A window assembly for use in a photosensitive device comprising a relatively thick monocrystalline substrate which is substantially transparent to radiation, on a surface of the substrate a relatively thin epitaxial monocrystalline layer of a semiconductive material capable of absorbing the said radiation, and means for effecting electrical charge transport to the semiconductive layer.

2. A window assembly as set forth in claim 1 wherein the semiconductive layer contains at least one PN junction.

3. A window assembly as set forth in claim 2 wherein the semiconductive layer on the side opposite the substrate contains a two-dimensional array of spaced PN junctions.

4. A window assembly as set forth in claim 1 wherein the substrates has a central thickness exceeding about 10 mils, the semiconductive layer is of N-type silicon having a central thickness below about 0.8 mil, the surface of the silicon remote from the substrate contains an array of P-type islands, and a passivating layer exists on the said surface with openings over the P-type islands.

5. A window assembly as set forth in claim 4 wherein the substrate is of sapphire.

6. A window assembly as set forth in claim 4 wherein an $n+$ layer of silicon is provided adjacent the substrate, and an electrical contact is provided to the $n+$ layer.

7. A vidicon-type imaging tube comprising an envelope, within the envelope adjacent one end means for producing a beam of electrons, the envelope portion at the opposite end being sealed off in a vacuum tight manner by a radiation transparent window of monocrystalline material, on the side of the window facing the beam-producing means a monocrystalline layer of a semiconductive material capable of absorbing the said radiation, said monocrystalline semiconductive layer being relatively thin compared with the window and being crystallographically related to the latter, and means effecting electrical connection to the semiconductive layer.

8. The invention of claim 7 wherein the semiconductive layer is of N-type silicon containing on the surface facing the beam-producing means an array of P-type islands.

9. The invention of claim 7 wherein the envelope is of metal and surrounds the space between the window and the beam-producing means to serve as a drift tube, and a mesh electrode is mounted parallel to the semiconductive layer on the metal envelope.

10. The invention of claim 7 wherein the window is of insulating material.

UNITED STATES PATENT OFFICE

CERTIFICATE OF CORRECTION

Patent No. 3579012 Dated May 18, 1971

Inventor(s) WALTER K. ZWICKER and ALFRED MILCH

It is certified that error appears in the above-identified patent and that said Letters Patent are hereby corrected as shown below:

Column 4, line 17, before "silicon" insert -- [111] --;

after "be" insert -- [0001] --.

Signed and sealed this 28th day of September 1971.

(SEAL)
Attest:

EDWARD M.FLETCHER,JR.
Attesting Officer

ROBERT GOTTSCHALK
Acting Commissioner of Patents